(12) United States Patent
Iimura

(10) Patent No.: US 8,042,937 B2
(45) Date of Patent: Oct. 25, 2011

(54) TEMPLE OF EYEGLASS FRAME

(75) Inventor: Yuichi Iimura, Tokyo (JP)

(73) Assignee: Four Nines, Inc., Tokyo (JP)

( * ) Notice: Subject to any disclaimer, the term of this patent is extended or adjusted under 35 U.S.C. 154(b) by 0 days.

(21) Appl. No.: 12/585,419

(22) Filed: Sep. 15, 2009

(65) Prior Publication Data

US 2011/0063566 A1    Mar. 17, 2011

(51) Int. Cl.
*G02C 5/16* (2006.01)
(52) U.S. Cl. .................. 351/114; 351/111; 351/113
(58) Field of Classification Search .......... 351/111, 351/153, 113, 114, 41, 158, 51, 52; 16/228; D16/101, 300, 304, 306, 309, 311–330, 335, D16/341; D29/110
See application file for complete search history.

(56) References Cited

U.S. PATENT DOCUMENTS

| | | | | |
|---|---|---|---|---|
| 1,017,702 A | * | 2/1912 | Swartwout | 351/111 |
| 5,386,254 A | * | 1/1995 | Kahaney | 351/60 |
| D377,041 S | * | 12/1996 | Garneau | D16/335 |
| D379,633 S | * | 6/1997 | Garneau | D16/315 |
| 6,000,797 A | | 12/1999 | Ichihashi | |

FOREIGN PATENT DOCUMENTS

| | | |
|---|---|---|
| DE | 969556 C | 6/1958 |
| DE | 29520939 U1 | 7/1996 |
| EP | 0080548 A | 6/1983 |
| EP | 1376201 A1 | 1/2004 |
| FR | 1010499 A | 6/1952 |
| FR | 1021325 A | 2/1953 |
| FR | 1463923 A | 7/1966 |
| FR | 2700397 A | 7/1994 |
| JP | 54-111158 U | 8/1979 |
| JP | 57-072416 U | 5/1982 |
| JP | 2003-315744 A | 11/2003 |

OTHER PUBLICATIONS

Search report of the EPO related to EP Patent Application No. 09170417.1-2217, dated Dec. 23, 2009, 4 pages.
Office Action issued in Japanese Patent Application No. 2007-101558, dated Jul. 19, 2011, 2 pages.

* cited by examiner

*Primary Examiner* — Hung Dang
(74) *Attorney, Agent, or Firm* — Bacon & Thomas, PLLC

(57) ABSTRACT

A temple for an eyeglass frame exerts an urging force onto a facial surface, and has a simple structure to make the manufacture and assembly thereof easy. The temple can be provided at an inexpensive cost. The temple comprises four surfaces of an inner surface 20, an outer surface 30, an upper surface 40, and a lower surface 50 on one end side, which end is linked to armor 70 with a hinge 60 put between the end and the armor 70. The outer surface 30 has outer surface concave portions 31, 32, and 33, each formed in a curved surface parallel to the rotation axis of the hinge 60. The portions of the inner surface 20 corresponding to the outer surface concave portions 31, 32, and 33 are formed in curved surfaces parallel to the curved surfaces of the outer surface concave portions 31, 32, and 33 to form an almost uniform thickness between the portions.

6 Claims, 5 Drawing Sheets

(4A) (4B) (4C)

(8A)  (8B)  (8C)

TEMPLE OF EYEGLASS FRAME

BACKGROUND OF THE INVENTION

1. Field of the Invention

The present invention relates to a temple for an eyeglass frame, and more particularly to a temple exerting an urging force onto a facial surface.

2. Description of the Related Art

There are various types of eyeglass frames. For example, an eyeglass frame equipped with a pair of ring-like rims, a bridge linking the inner edge portions of both of the rims together, and temples rotatably linked to the outer edge portions of both of the rims with spring hinges put between the temples and the outer edge portions has been known. The eyeglass frame disclosed in Japanese Patent Application Laid-Open Publication No. 2003-185981 is equipped with spring hinges each linking a temple and armor together, and is configured so that the tip of a blade spring provided on each of the temples abuts against the end of each piece of the armor at a predetermined position when the temple is opened.

Then, if the temple is further opened from the predetermined position, the blade spring bends as the temple opens, and a restoring force tending to push back the temple to the predetermined position is exerted. Accordingly, if the degrees of the openings of the temples are previously adjusted to the ones opened by a little more than the predetermined positions when the eyeglass frame is worn, then an urging force can be exerted onto the facial surface, and consequently the eyeglasses can be used in the state of being fitted for the face.

However, because the structures of the spring hinges are complicated, the eyeglass frame mentioned above has the problem of taking a lot of trouble with the manufacture and assembly thereof to makes the cost thereof high. Moreover, the eyeglass frame has the problem of needing periodical maintenance in order to maintain the initial performance thereof for a long time. Furthermore, the spring hinge has the problem of enlarging the shapes of the temples to make it impossible to smartly design the eyeglass frame.

BRIEF SUMMARY OF THE INVENTION

The present invention solves the problems mentioned above, and aims to provide a temple for an eyeglass frame which temple exerts an urging force onto a facial surface and has a simple structure to enable the manufacture and assembly thereof to be easy to suppress the production cost thereof to be inexpensive. Moreover, the present invention aims to provide a temple capable of maintaining the initial performance thereof for a long time without needing any maintenance. Furthermore, the present invention aims to provide a temple capable of being smartly designed.

In order to solve the problems mentioned above, according to a first aspect of the present invention, a temple for an eyeglass frame adopts the configuration in which the temple comprises four surfaces of an inner surface, an outer surface, an upper surface, and a lower surface on one end side, the end linked to armor with a hinge put between the end and the armor, wherein the outer surface is formed to have at least one outer surface concave portion formed in a curved surface parallel to a rotation axis of the hinge, and the inner surface is formed to have at least a portion corresponding to the outer surface concave portion, the corresponding portion formed in a curved surface parallel to the curved surface of the outer surface concave portion to form an almost uniform thickness between the portions.

Moreover, according to a second aspect of the present invention, a temple is the one according to the first aspect, wherein the temple is configured to have a plurality of the outer surface concave portions.

Moreover, according to a third aspect of the present invention, a temple for an eyeglass frame adopts the configuration in which the temple comprises four surfaces of an inner surface, an outer surface, an upper surface, and a lower surface on one end side, the end linked to armor with a hinge put between the end and the armor, wherein the outer surface is formed to have at least one outer surface concave portion formed in a curved surface parallel to a rotation axis of the hinge, the inner surface is formed to have at least one inner surface concave portion formed in a curved surface parallel to the rotation axis of the hinge adjacently to the outer surface concave portion, and a boundary portion between the outer surface concave portion and the inner surface concave portion, both adjoining each other, is formed to have an almost uniform thickness.

Moreover, according to a fourth aspect of the present invention, a temple is the one according to the third aspect, wherein the temple is configured to have a plurality of the outer surface concave portions.

By adopting the configurations mentioned above, the eyeglass frames of the present invention severally have a very simple structure to enable their manufacture and assembly to be easy, and consequently their costs can be suppressed to be inexpensive. Moreover, the eyeglass frames can maintain their initial performances for a long time without needing any periodical maintenance. Furthermore, the eyeglass frames can be smartly designed with high design properties owing to their unique shapes.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

Figure 1:
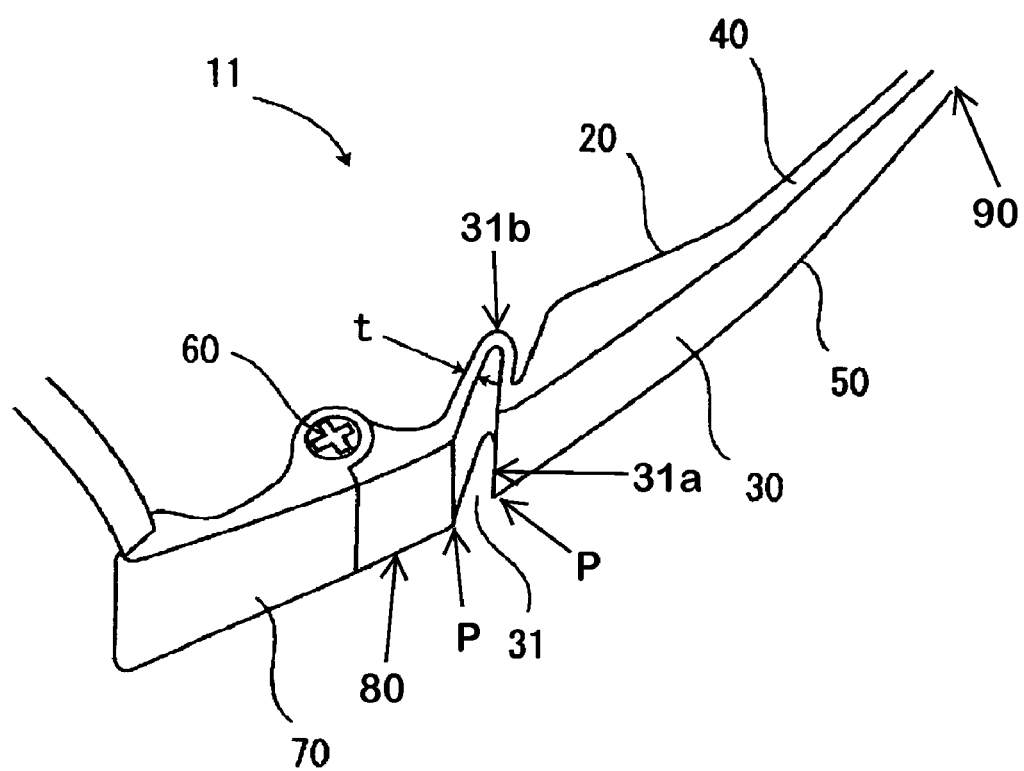
FIG. 1 is a schematic perspective view showing an example of a temple according to a first embodiment of the present invention.

FIGS. 1-4C show temples according to a first embodiment of the present invention. FIG. 1 shows a temple 11 for an eyeglass frame, where a first end 80 is linked to armor 70 with a hinge 60 put between them. The first end 80 and a second end 90 have four surfaces which are an inner surface 20, an outer surface 30, an upper surface 40, and a lower surface 50. The outer surface 30 has an outer surface concave portion 31 formed in a curved surface parallel to the rotation axis of the hinge 60 on a smooth flat surface or a curved surface. Outer surface concave portion 31 includes an opening 31a, which opens to the outer surface, and a bottom portion 31b, which is located in a position closer to the second end 90; whereas the opening 31a is positioned closer to the first end 80 as seen in FIG. 1. As further seen in FIG. 1, the corner that is formed by the outer surface 30 engaging the concave portion 31 at the curved surface of opening 31a is not a rounded edge. Instead, the corner forms a sharp point, P. A portion of the inner surface 20 corresponding to the outer surface concave portion 31 is formed in a curved surface parallel to the curved surface of the outer surface concave portion 31 to have an almost uniform thickness t.

The temple 11 uses the portion having the thickness t as a spring. It is preferable to form the spring portion of a metal or a resin having high elasticity, and to integrally form the spring portion with the temple 11 as a part thereof. Moreover, the curved surfaces, such as the outer surface concave portion 31, can be formed by the method of molding or cutting.

By suitably selecting the quality of a material and the thickness t, an optimum urging force can be exerted on a facial surface. That is, if the temple 11 attached to an eyeglass frame is opened along a rotation surface, then the hinge 60 is fully opened at a predetermined position. If it is tried to further open the temple 11, then the temple 11 opens in the same rotation surface owing to the elastic deformation of the spring portion. Consequently, the urging force can be exerted onto the facial surface without causing any uncomfortable feelings.

Figure 2:
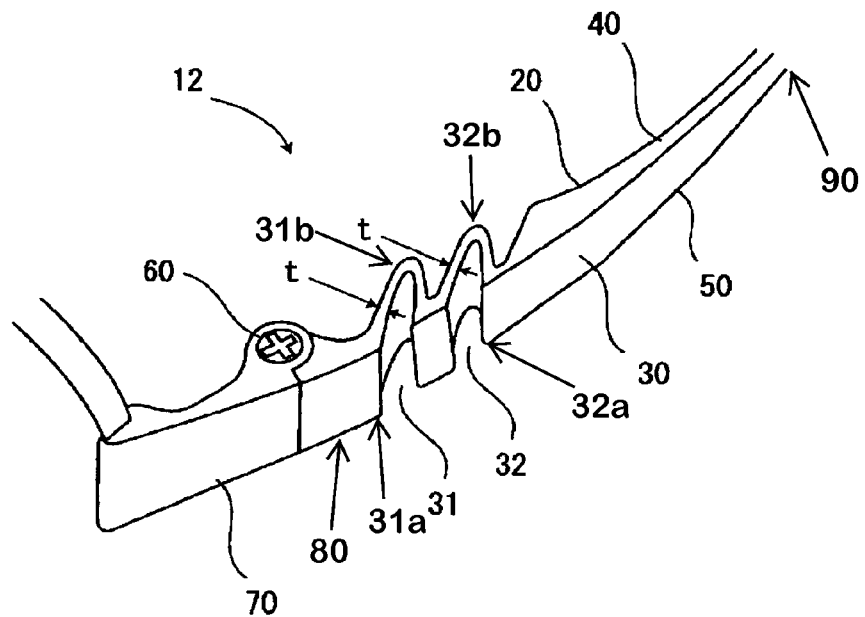
FIG. 2 is a schematic perspective view showing another example of the temple according to the first embodiment.

FIG. 2 shows a temple 12 for an eyeglass frame, where a first end 80 is linked to the armor 70 with the hinge 60 put between them. The first end 80 and a second end 90 have four surfaces which are the inner surface 20, the outer surface 30, the upper surface 40, and the lower surface 50. The outer surface 30 has two outer surface concave portions 31 and 32 formed in curved surfaces parallel to the rotation axis of the hinge 60 on a smooth flat surface or a curved surface. Outer surface concave portions 31 and 32 include openings 31a, 32a, which opens to the outer surface, and bottom portions 31b, 32b, which are located in positions closer to the second end 90; whereas the openings are positioned closer towards the first end 80 as seen in FIG. 2. Portions of the inner surface 20 corresponding to the outer surface concave portions 31 and 32 are formed in curved surfaces parallel to the curved surfaces of the outer surface concave portions 31 and 32 to severally have the almost uniform thickness t.

The temple 12 uses the portions having the thickness t as springs. It is preferable to form the spring portions of a metal or a resin having high elasticity, and to integrally form the spring portions with the temple 12 as parts thereof. Moreover, the curved surfaces, such as the outer surface concave portions 31 and 32, can be formed by the method of molding or cutting.

By suitably selecting the quality of a material and the thickness t, an optimum urging force can be exerted on a facial surface. That is, if the temple 12 attached to an eyeglass frame is opened along a rotation surface, then the hinge 60 is fully opened at a predetermined position. If it is tried to further open the temple 12, then the temple 12 opens in the same rotation surface owing to the elastic deformations of the spring portions. Consequently, the urging force can be exerted onto the facial surface without causing any uncomfortable feelings.

Figure 3:
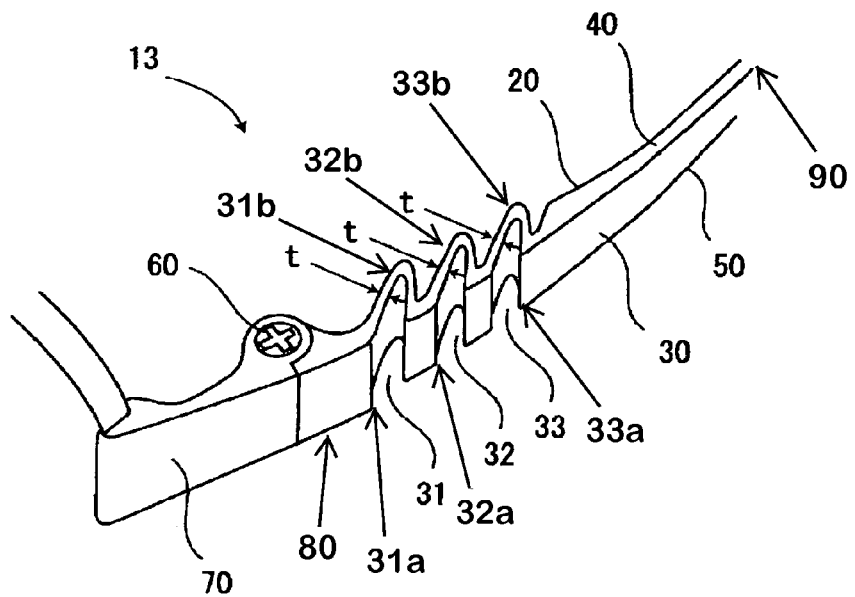
FIG. 3 is a schematic perspective view showing the other example of the temple according to the first embodiment.
Figure 4:
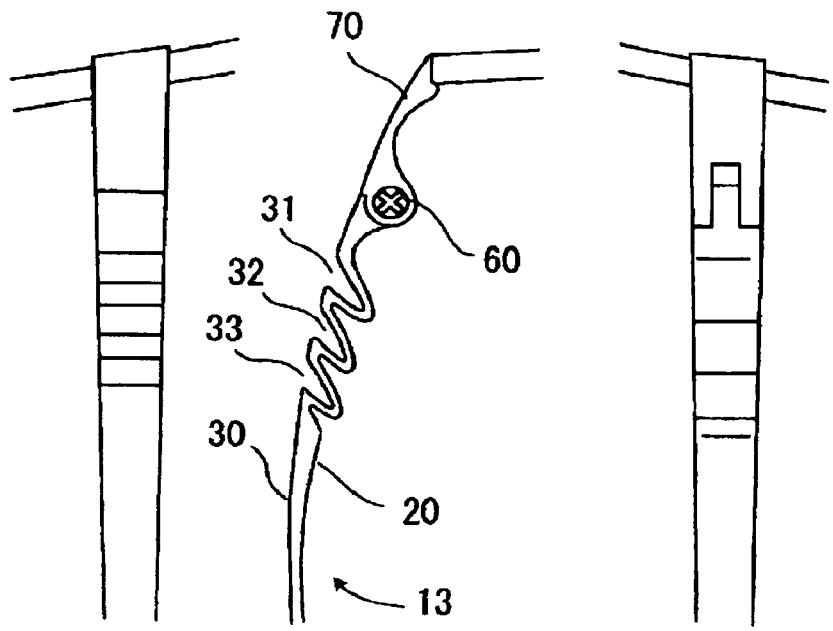
FIGS. 4A, 4B, and 4C are a schematic outer side view, a schematic plan view, and a schematic inner side view of the temple shown in FIG. 3, respectively.

FIG. 3 shows a temple 13 for an eyeglass frame, where a first end 80 is linked to the armor 70 with the hinge 60 put between them. The first end 80 and a second end 90 have four surfaces which are the inner surface 20, the outer surface 30, the upper surface 40, and the lower surface 50. The outer surface 30 has three outer surface concave portions 31, 32, and 33 formed in curved surfaces parallel to the rotation axis of the hinge 60 on a smooth flat surface or a curved surface. Outer surface concave portions 31, 32, and 33 include openings 31a, 32a, 33a, which opens to the outer surface, and bottom portions 31b, 32b, 33b, which are located in positions closer to the second end 90; whereas the openings are positioned closer towards the first end 80 as seen in FIG. 3. Portions of the inner surface 20 corresponding to the outer surface concave portions 31, 32, and 33 are formed in curved surfaces parallel to the curved surfaces of the outer surface concave portions 31, 32, and 33 to severally have the almost uniform thickness t.

Incidentally, FIGS. 4A, 4B, and 4C show a schematic outer side view (left side), a schematic plan view (center), and a schematic inner side view (right side) of the temple 13, respectively.

The temple 13 uses the portions having the thickness t as springs. It is preferable to form the spring portions of a metal or a resin having high elasticity, and to integrally form the spring portions with the temple 13 as parts thereof. Moreover, the curved surfaces, such as the outer surface concave portions 31, 32, and 33, can be formed by the method of molding or cutting.

By suitably selecting the quality of a material and the thickness t, an optimum urging force can be exerted on a facial surface. That is, if the temple 13 attached to an eyeglass frame is opened along a rotation surface, then the hinge 60 is fully opened at a predetermined position. If it is tried to further open the temple 13, then the temple 13 opens in the same rotation surface owing to the elastic deformations of the spring portions. Consequently, the urging force can be exerted onto the facial surface without causing any uncomfortable feelings.

As described above, the temples 11, 12, and 13 of the first embodiment severally have a simple structure, and can be manufactured at inexpensive costs. Furthermore, the temples 11, 12, and 13 do not need any maintenance. It is preferable to set the number of the concave portions on the outer side to be plural from both of the points of views of the sense of use and a design property. Thereby, the temples have unique shapes and can be smartly designed.

Figure 5:
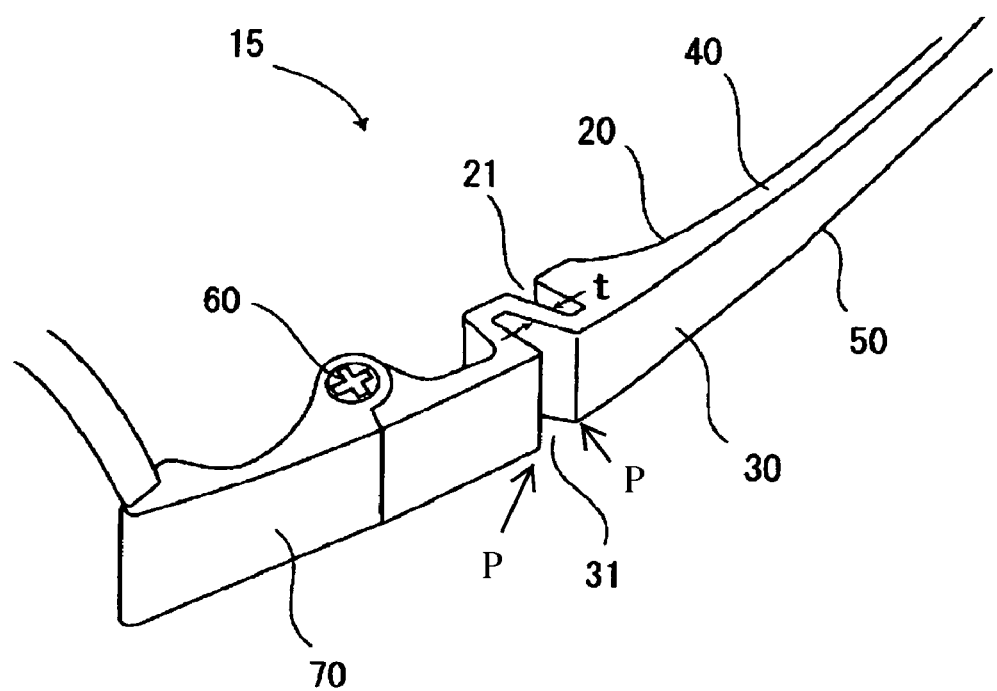
FIG. 5 is a schematic perspective view showing an example of a temple according to a second embodiment of the present invention.

FIGS. 5-8C show temples according to a second embodiment of the present invention. FIG. 5 shows a temple 15 for an eyeglass frame, one end of which is linked to the armor 70 with the hinge 60 put between them. The four surfaces of the inner surface 20, the outer surface 30, the upper surface 40, and the lower surface 50 are formed on the side of the end. The outer surface 30 has the outer surface concave portion 31 formed in a curved surface parallel to the rotation axis of the hinge 60 on a smooth flat surface or a curved surface. As seen in FIG. 5, the corner that is formed by the outer surface 30 engaging the concave portion 31 at the curved surface is not a rounded edge. Instead, the corner forms a sharp point, P. The inner surface 20 has an inner surface concave portion 21 formed in a curved surface parallel to the rotation axis of the hinge 60 on a smooth flat surface or a curved surface. Then, the boundary portion between the outer surface concave portion 31 and the inner surface concave portion 21, both adjacent to each other, is formed to have the almost uniform thickness t.

The temple 15 uses the portion having the thickness t as a spring. It is preferable to form the spring portion of a metal or a resin having high elasticity, and to integrally form the spring portion with the temple 15 as a part thereof. Moreover, the curved surfaces, such as the outer surface concave portion 31, can be formed by the method of molding or cutting.

By suitably selecting the quality of a material and the thickness t, an optimum urging force can be exerted on a facial surface. That is, if the temple 15 attached to an eyeglass frame is opened along a rotation surface, then the hinge 60 is fully opened at a predetermined position. If it is tried to further open the temple 15, then the temple 15 opens in the same rotation surface owing to the elastic deformation of the spring portion. Consequently, the urging force can be exerted onto the facial surface without causing any uncomfortable feelings.

Figure 6:
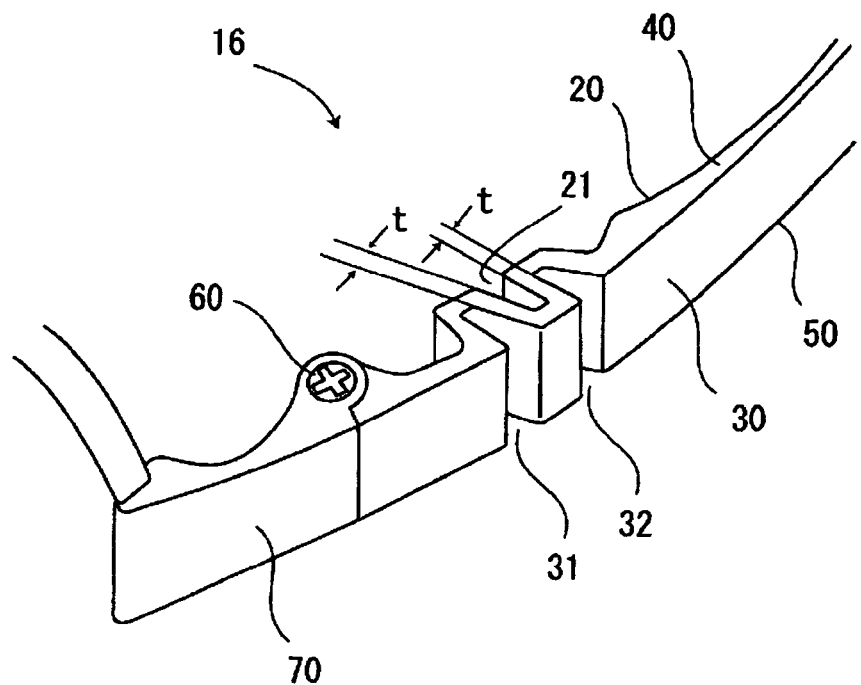
FIG. 6 is a schematic perspective view showing another example of the temple according to the second embodiment.

FIG. 6 shows a temple 16 for an eyeglass frame, one end of which is linked to the armor 70 with the hinge 60 put between them. The four surfaces of the inner surface 20, the outer surface 30, the upper surface 40, and the lower surface 50 are formed on the side of the end. The outer surface 30 has the two outer surface concave portions 31 and 32 formed in curved surfaces parallel to the rotation axis of the hinge 60 on a smooth flat surface or a curved surface. The inner surface 20 has the one inner surface concave portion 21 formed in a curved surface parallel to the rotation axis of the hinge 60 on a smooth flat surface or a curved surface. Then, the boundary portions between the outer surface concave portions 31 and 32 and the inner surface concave portion 21, which are adjacent to each other, are severally formed to have the almost uniform thickness t.

The temple 16 uses the portions having the thickness t as springs. It is preferable to form the spring portions of a metal or a resin having high elasticity, and to integrally form the spring portions with the temple 16 as parts thereof. Moreover, the curved surfaces, such as the outer surface concave portions 31 and 32, can be formed by the method of molding or cutting.

By suitably selecting the quality of a material and the thickness t, an optimum urging force can be exerted on a facial surface. That is, if the temple 16 attached to an eyeglass frame is opened along a rotation surface, then the hinge 60 is fully opened at a predetermined position. If it is tried to further open the temple 16, then the temple 16 opens in the same rotation surface owing to the elastic deformations of the spring portions. Consequently, the urging force can be exerted onto the facial surface without causing any uncomfortable feelings.

Figure 7:
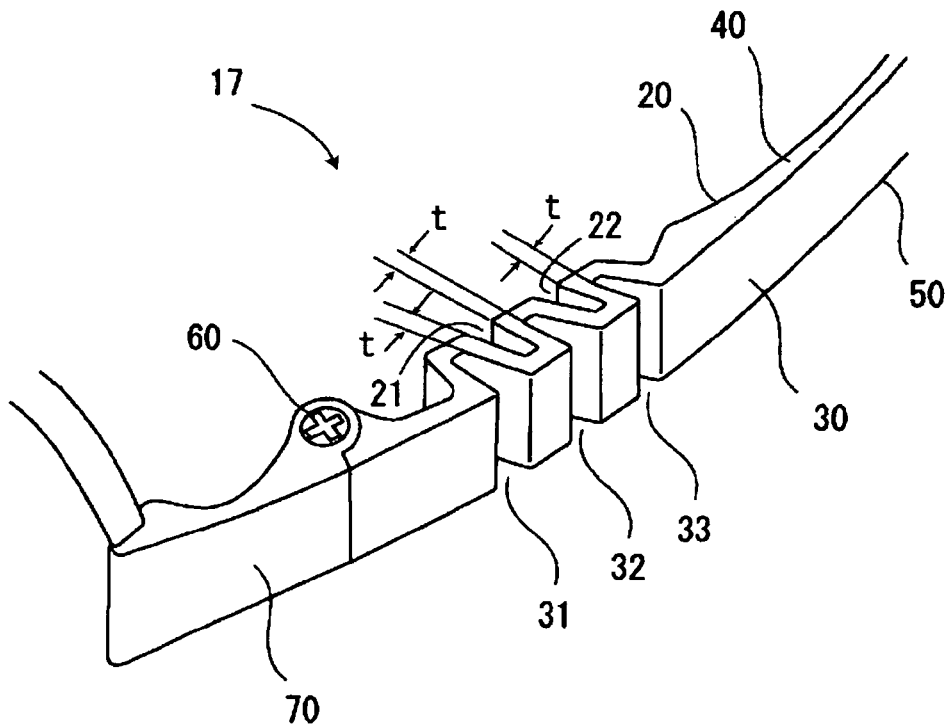
FIG. 7 is a schematic perspective view showing the other example of the temple according to the second embodiment.
Figure 8:
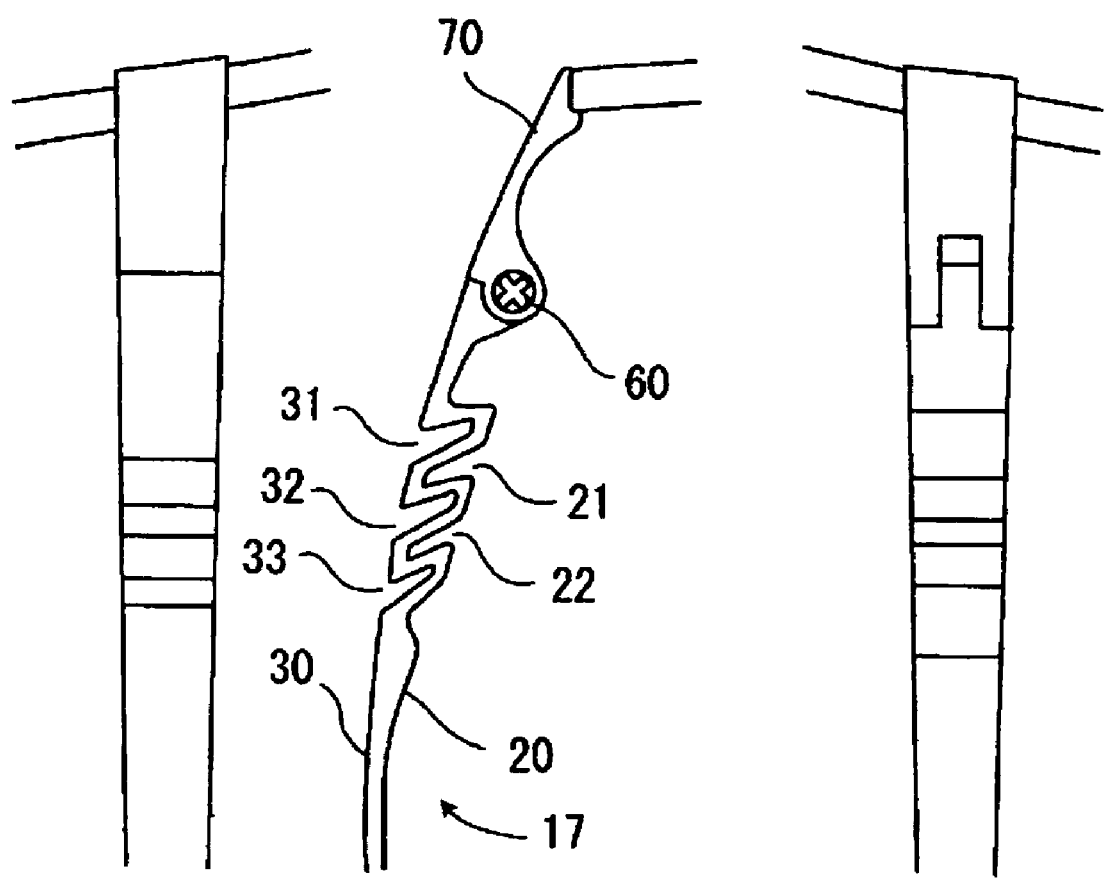
FIGS. 8A, 8B, and 8C are a schematic outer side view, a schematic plan view, and a schematic inner side view of the temple shown in FIG. 7, respectively.

FIG. 7 shows a temple 17 for an eyeglass frame, one end of which is linked to the armor 70 with the hinge 60 put between them. The four surfaces of the inner surface 20, the outer surface 30, the upper surface 40, and the lower surface 50 are formed on the side of the end. The outer surface 30 has the three outer surface concave portions 31, 32, and 33 formed in curved surfaces parallel to the rotation axis of the hinge 60 on a smooth flat surface or a curved surface. The inner surface 20 has two inner surface concave portions 21 and 22 formed in curved surfaces parallel to the rotation axis of the hinge 60 on a smooth flat surface or a curved surface. Then, the boundary portions between the outer surface concave portions 31, 32, and 33 and the inner surface concave portions 21 and 22, which are adjacent to each other, are severally formed to have the almost uniform thickness t.

Incidentally, FIGS. 8A, 8B, and 8C show a schematic outer side view (left side), a schematic plan view (center), and a schematic inner side view (right side) of the temple 17, respectively.

The temple 17 uses the portions having the thickness t as springs. It is preferable to form the spring portions of a metal or a resin having high elasticity, and to integrally form the spring portions with the temple 17 as parts thereof. Moreover, the curved surfaces, such as the outer surface concave portions 31, 32, and 33, can be formed by the method of molding or cutting.

By suitably selecting the quality of a material and the thickness t, an optimum urging force can be exerted on a facial surface. That is, if the temple 17 attached to an eyeglass frame is opened along a rotation surface, then the hinge 60 is fully opened at a predetermined position. If it is tried to further open the temple 17, then the temple 17 opens in the same rotation surface owing to the elastic deformations of the spring portions. Consequently, the urging force can be exerted onto the facial surface without causing any uncomfortable feelings.

As described above, the temples 15, 16, and 17 of the second embodiment severally have a simple structure, and can be manufactured at inexpensive costs. Furthermore, the temples 15, 16, and 17 do not need any maintenance. It is preferable to set the number of the concave portions on the outer side to be plural from both of the points of views of the sense of use and a design property. Thereby, the temples have unique shapes and can be smartly designed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A temple for an eyeglass frame, comprising a first end having four surfaces of an inner surface, an outer surface, an upper surface, and a lower surface, the first end linked to armor with a hinge put between the first end and the armor and a second end located on a side opposite to the first end, wherein the outer surface is formed to have at least one outer surface concave portion formed in a curved surface parallel to a rotation axis of the hinge wherein the corner formed between the outer surface and the curved surface is sharp, wherein the outer surface concave portion includes an opening which opens to the outer surface and a bottom portion which is located in a position closer to the second end than the opening, and wherein the inner surface is formed to have at least a portion corresponding to the outer surface concave portion, the corresponding portion formed in a curved surface parallel to the curved surface of the outer surface concave portion to form an almost uniform thickness between the portions.

2. The temple according to claim 1, wherein the temple has a plurality of the outer surface concave portions.

3. The temple according to claim 1, wherein the inner surface is formed to have at least one inner surface concave portion formed in a curved surface parallel to the rotation axis of the hinge adjacently to the outer surface concave portion, and
   a boundary portion between the outer surface concave portion and the inner surface concave portion, both adjoining each other, is formed to have an almost uniform thickness.

4. The temple according to claim 3, wherein the temple has a plurality of the outer surface concave portions.

5. The temple according to claim 1, wherein the bottom portion is located in a position closer to the second end than a center of the opening.

6. The temple according to claim 1, wherein the bottom portion is located in a position which does not overlap with the opening in a direction orthogonal to a direction toward the second end from the first end.

* * * * *